(12) United States Patent
Doi (10) Patent No.: US 11,272,071 B2
(45) Date of Patent: Mar. 8, 2022

(54) IMAGE PROCESSING APPARATUS THAT READS IMAGE DATA FROM DOCUMENTS, IMAGE PROCESSING METHOD, AND RECORDING MEDIUM

(71) Applicant: KYOCERA Document Solutions Inc., Osaka (JP)

(72) Inventor: Tomihito Doi, Cebu (PH)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/116,742

(22) Filed: Dec. 9, 2020

(65) Prior Publication Data

US 2021/0176374 A1   Jun. 10, 2021

(30) Foreign Application Priority Data

Dec. 9, 2019   (JP) .............................. JP2019-222411

(51) Int. Cl.
*H04N 1/21* (2006.01)
*H04N 1/00* (2006.01)
*G06F 3/12* (2006.01)

(52) U.S. Cl.
CPC ......... *H04N 1/2104* (2013.01); *G06F 3/1296* (2013.01); *H04N 1/00798* (2013.01); *H04N 1/00832* (2013.01)

(58) Field of Classification Search
CPC ............. H04N 1/2104; H04N 1/00798; H04N 1/00832; H04N 2201/3216; H04N 1/32486; H04N 1/00482; H04N 1/00485; G06F 3/1296
See application file for complete search history.

(56) References Cited

U.S. PATENT DOCUMENTS

2006/0159480 A1\* 7/2006 Mima ........................ B41J 3/60
                                                                    399/82
2015/0036166 A1\* 2/2015 Kadota .............. H04N 1/00244
                                                                    358/1.14
2020/0314278 A1\* 10/2020 Okuzono ........... H04N 1/00824

FOREIGN PATENT DOCUMENTS

JP          2005-198177 A       7/2005

\* cited by examiner

*Primary Examiner* — Iriana Cruz
(74) *Attorney, Agent, or Firm* — Hawaii Patent Services; Nathaniel K. Fedde; Kenton N. Fedde

(57) ABSTRACT

Provided is an image processing apparatus, an image processing method, and a recording medium capable of reproducing a plurality of copies of a document bundle while reducing the storage capacity of a storage device. In the image processing apparatus, a number of copies of a document bundle to be a reading target by an image reading unit that reads image data from each of the documents included in one or a plurality of copies of a document bundle is specified. Then, in a case where the specified number of copies of the document bundle is plural, document bundle image data corresponding to one copy of the document bundle of the image data read by the image reading unit, and specification information including at least the number of copies of the document bundle specified by the specification processing unit are correlated and stored.

9 Claims, 5 Drawing Sheets

IMAGE PROCESSING APPARATUS THAT READS IMAGE DATA FROM DOCUMENTS, IMAGE PROCESSING METHOD, AND RECORDING MEDIUM

INCORPORATION BY REFERENCE

This application is based on and claims the benefit of priority from Japanese Patent Application No. 2019-222411 filed on Dec. 9, 2019, the contents of which are hereby incorporated by reference.

BACKGROUND

The present disclosure relates to an image processing apparatus that reads image data from a document.

In an image processing apparatus having an image reading function such as a scanner, a copier, a multifunction machine and the like, it is possible to read image data from each document included in the document bundle and store the image data in a storage device. This makes it possible to read the image data once read from the storage device and execute a printing process for reproducing the document bundle. Note that there is also known a technique of storing the image data in the storage device when the image data of the same document is read for the second time based on additional information added to the document.

SUMMARY

The image processing apparatus according to one aspect of the present disclosure includes a specification processing unit and a storage processing unit. The specification processing unit specifies the number of copies of a document bundle that is a reading target by an image reading unit that reads image data from each document included in one or a plurality of copies of a document bundle. The storage processing unit, in a case where the number of copies of the document bundle specified by the specification processing unit is plural, correlates and stores document bundle image data corresponding to one copy of the document bundle of the image data read by the image reading unit, and specification information including at least the number of copies of the document bundle specified by the specification processing unit.

The image processing method according to another aspect of the present disclosure includes a specification step, and a storage step. The specification step specifies the number of copies of a document bundle that is a reading target by an image reading unit that reads image data from each document included in one or a plurality of copies of the document bundle. The storage step that, in a case where the number of copies of the document bundle specified by the specification processing unit is plural, correlates and stores document bundle image data corresponding to one copy of the document bundle of the image data read by the image reading unit, and specification information including at least the number of copies of the document bundle specified in the specification step.

The recording medium according to another aspect of the present disclosure is a non-transitory computer-readable recording medium that stores an image processing program that can be executed by a processor of an image processing apparatus; the image processing program, when executed, causes the processor to specify a number of copies of a document bundle that is a reading target by an image reading unit that reads image data from each document included in one copy or a plurality of copies of the document bundle. Then, in a case where the specified number of copies of the document bundle is plural, it causes the processor to correlate and store document bundle image data corresponding to one copy of the document bundle of the image data read by the image reading unit, and specification information including at least the number of copies of the document bundle specified in the specification step.

DETAILED DESCRIPTION

Hereinafter, embodiments of the present disclosure will be described with reference to the accompanying drawings to aid in understanding the present disclosure. Note that the following embodiments are examples that embody a technique according to the present disclosure, and do not limit the technical scope of the present disclosure.

Figure 1:
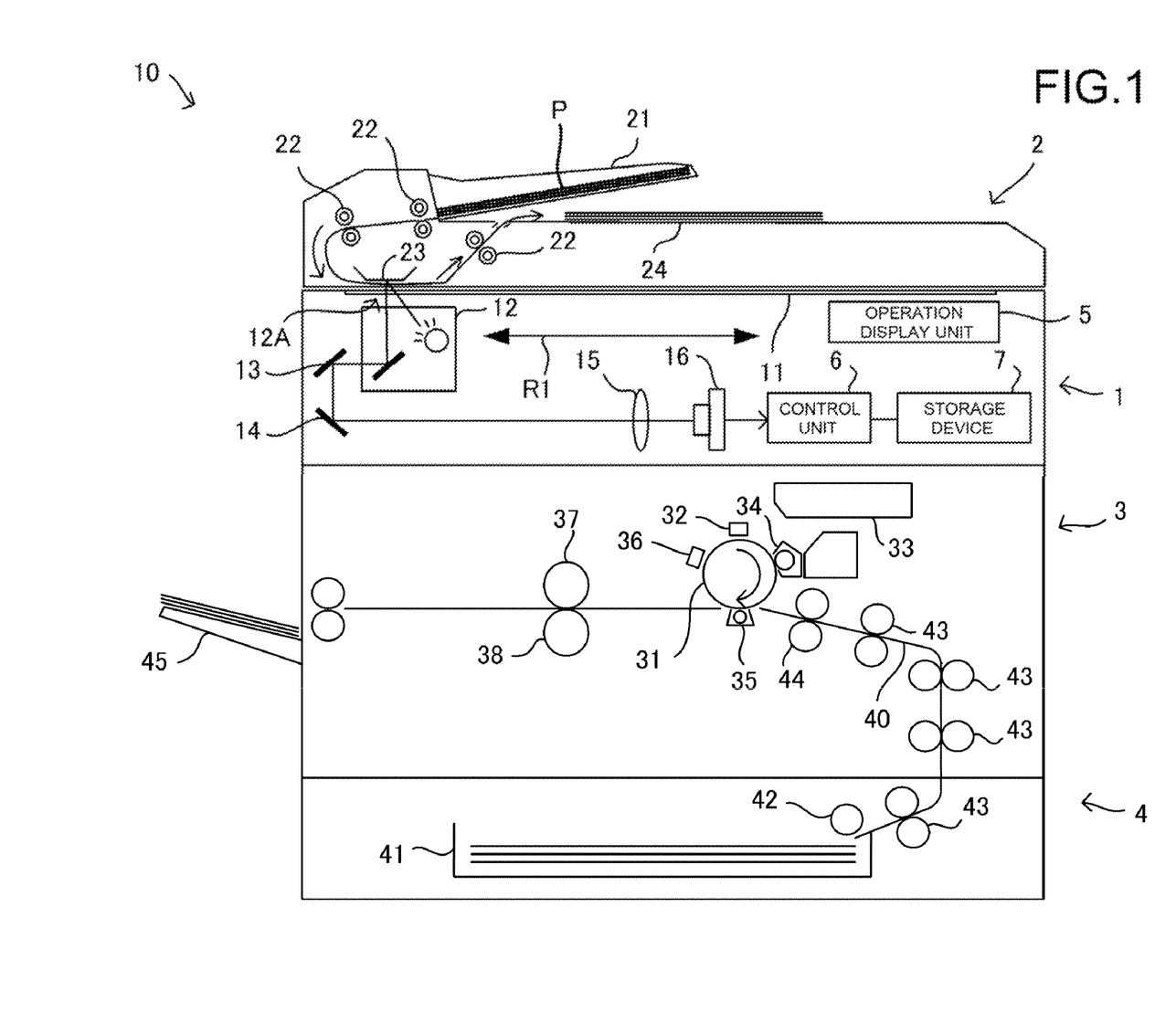
FIG. 1 is a schematic configuration diagram of an image forming apparatus of an embodiment according to the present disclosure.
Figure 2:
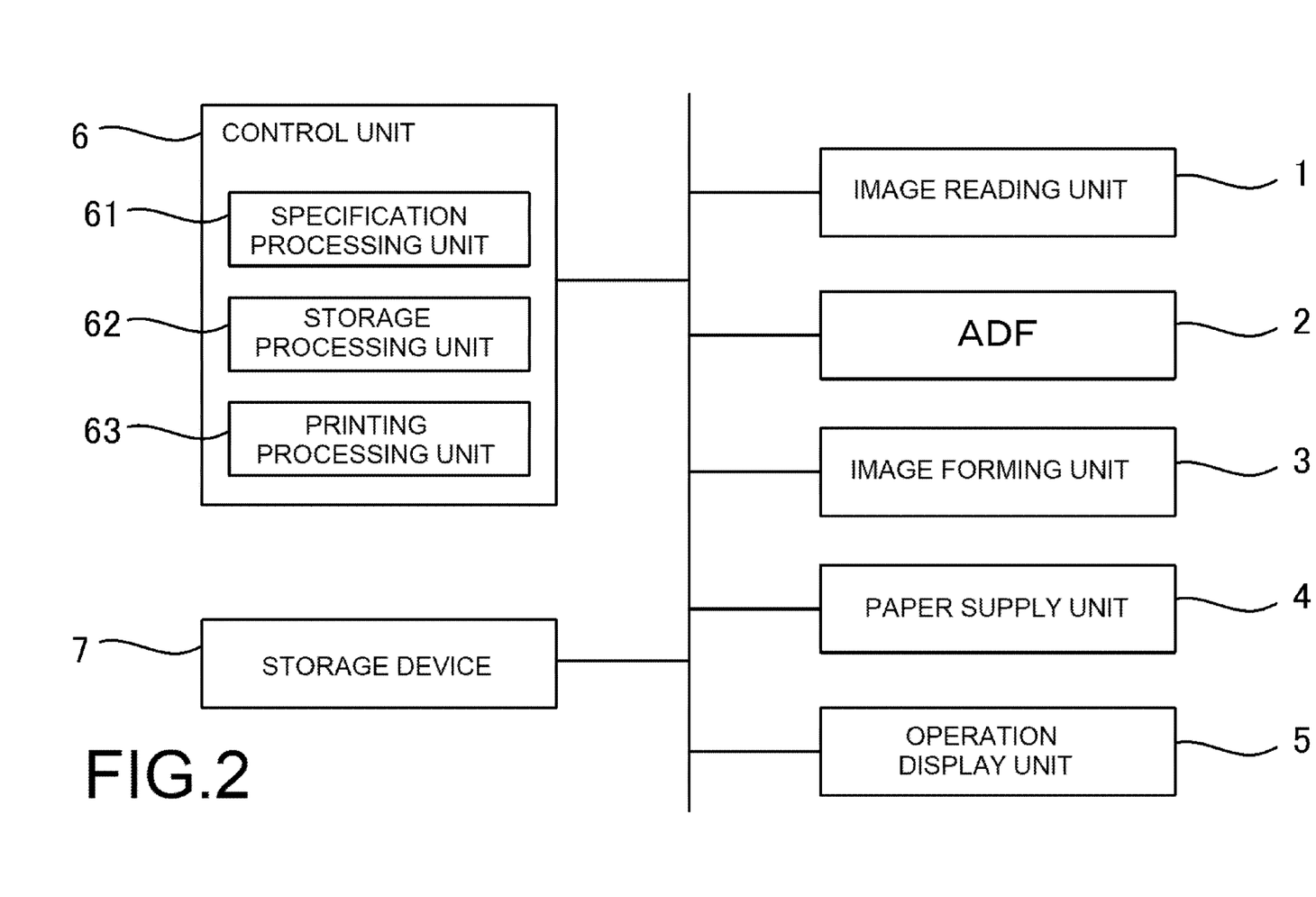
FIG. 2 is a block diagram illustrating a schematic configuration an image forming apparatus of an embodiment according to the present disclosure.

As illustrated in FIGS. 1 and 2, the image forming apparatus 10 is a multifunction machine that includes an image reading unit 1, an ADF (Auto Document Feeder) 2, an image forming unit 3, a paper supply unit 4, an operation display unit 5, a control unit 6, a storage device 7 and the like, and is an example of an image processing apparatus according to the present disclosure.

The image forming apparatus 10 may be connected to an information processing apparatus such as a personal computer, a mobile terminal or the like via a network such as a LAN. Then, the image forming apparatus 10 is able to execute an image forming process for forming an image on a sheet based on image data inputted from the information processing apparatus, a network scanning process for transmitting image data read from the document to the information processing apparatus, and the like. Note that in the disclosure of the present application, a personal computer capable of communicating with the image forming apparatus 10 and causing the image forming apparatus 10 to perform the same processing as an image storage process or printing control process described later (see FIG. 3 or FIG. 4) is given as an example of an image processing apparatus according to the disclosure of the present application.

The image reading unit 1 is an image reading unit that includes a contact glass 11, a reading unit 12, mirrors 13, 14, an optical lens 15, a CCD (Charge Coupled Device) 16, and the like. Note that the image reading unit 1 may be an image reading unit that uses a CIS (Contact Image Sensor). It should also be noted that the image reading unit 1 is able to read image data from a document P placed on the contact glass 11 by moving the reading unit 12 back-and-forth in the direction R1.

The ADF 2 is an automatic document conveying apparatus that includes a document setting unit 21, a plurality of conveying rollers 22, a document retainer 23, a paper discharge unit 24, and the like, and is capable of sequentially conveying a plurality of documents P. By driving each of the conveying rollers 22 by a motor, the ADF 2 allows one or a plurality of documents P set in the document setting unit 21 to pass by a reading position 12A on the contact glass 11 one by one to the paper discharge unit 24. As a result, the image reading unit 1 is able to sequentially read the image data of the document P when each document P included in a document bundle of one or a plurality of documents set in the document setting unit 21 passes by the reading position 12A.

Moreover, the image reading unit 1 reads the image data on the front surface of the document P conveyed by the ADF 2; however, the image forming apparatus 1 may also be provided with a separate image reading unit such as the CIS or the like that is able to read the image data on the back surface of a document P conveyed by the ADF 2. Note that the ADF 2 is provided with a double-sided conveying mechanism capable of reversing the front and back surfaces of the document P after passing by the reading position 12A and then cause the document P to pass by the reading position 12A again, and the image reading unit 1 may be able to read image data from the front and back surfaces of the document P conveyed by using the double-sided conveying mechanism. Note that in a case where the image data is read from the front and back surfaces of the document P, it is determined that the front surface of the document P is the first page and the back surface is the second page.

The image forming unit 3 is an electrophotographic image forming unit that forms an image on a sheet supplied from the paper supply unit 4 based on image data read by the image reading unit 1 or image data inputted from the information processing apparatus. More specifically, the image forming unit 3 includes a photosensitive drum 31, a charging device 32, an LSU (laser scanner unit) 33, a developing device 34, a transfer roller 35, a static elimination device 36, a fixing roller 37, a pressure roller 38, and the like. Note that, the image forming unit 3 may be an inkjet type image forming unit.

Moreover, the image forming unit 3 may be provided with a double-sided printing mechanism that reverses the front and back surfaces of a sheet after an image is formed on one surface (front surface) by the image forming unit 3 and then conveys the sheet on which the image is formed to the image forming unit 3 again and the image forming unit 3 forms an image on the other side (back side).

The paper supply unit 4 includes a sheet conveying path 40, a sheet accommodating unit 41, a pickup roller 42, a conveying rollers 43, a registration rollers 44, a paper discharge tray 45, and the like. The paper supply unit 4 is controlled by the control unit 6 so as to pass a sheet accommodated in the sheet accommodating unit 41 through the image forming unit 3 and discharge the sheet to the paper discharge tray 45.

The operation display unit 5 includes a display unit such as a liquid crystal display that displays various types of information, and an operation unit such as a touch panel that receives operations of touch keys displayed on the display unit. Note that the operation unit may also include hard keys such as a start button for receiving start requests for various jobs.

For example, the operation display unit 5 displays an operation screen for receiving setting operations for various jobs to be executed by the image forming apparatus 10 based on an instruction from the control unit 6, receives a setting operation performed using the operation screen and inputs the set operation to the control unit 6.

The control unit 6 includes control devices such as a CPU, ROM, RAM, and the like. The CPU is a processor that executes various arithmetic processes. The ROM is a non-volatile storage device in which information such as a control program or the like for causing the CPU to execute various processes is stored in advance. The RAM is a volatile storage device used as a temporary storage memory (work area) for various processes executed by the CPU. The control unit 6 controls the image forming apparatus 10 by the CPU executing processes according to the control program stored in the ROM, the storage device 7, or the like.

The storage device 7 is a non-volatile storage device such as an HDD (Hard Disk Drive) or an SSD (Solid State Drive). More specifically, the storage device 7 stores various data such as image data read by the image reading unit 1 and specification information or the like described later. Moreover, the storage device 7 also stores an image processing program or the like as a control program to be executed by the control unit 6.

Incidentally, a case in which the number of copies of a document bundle of a reading target by the image processing apparatus such as the image processing apparatus 10 is a plurality will be described. In this case, by storing all of the image data of the plurality of copies of the document bundle in the storage device 7, the storage capacity of the storage device 7 is used in a wasteful manner. However, in the image forming apparatus 10 according to the present embodiment, it is possible to reproduce a plurality of copies of the document bundle corresponding to the read image data while reducing the storage capacity required for the storage device 7.

More specifically, as illustrated in FIG. 2, in the image forming apparatus 10 according to the present embodiment, the control unit 6 includes a specification processing unit 61, a storage processing unit 62, and a printing processing unit 63. For example, the control unit 6 functions as the specific processing unit 61, the storage processing unit 62, and the printing processing unit 63 by the CPU executing processes according to the image processing program stored in the storage device 7. Note that in addition, any one or more of the specification processing unit 61, the storage processing unit 62, and the printing processing unit 63 may be an electronic circuit such as an ASIC or the like.

The specification processing unit 61 specifies the number of copies of the document bundle that is the reading target by the image reading unit 1 that reads image data from each document P included in one or a plurality of copies of a document bundle. The number of copies of a document bundle is specified in units of a series of image reading processes executed as one job by the image reading unit 1. Note that a document bundle includes one or a plurality of documents P.

More specifically, the specification processing unit 61 specifies the number of image data having the same content of the image data read by the image reading unit 1 as the number of copies of a document bundle. For example, the specification processing unit 61, by using an OCR (Optical Character Reader) function, specifies characters included in the image data, and based on the characters, determines whether or not the content of the image data is the same. In this case, even when page number information is included in a specific position of the document P in the image data, the specification processing unit 61 may determine that the content of image data having the same page number is the same. Moreover, when additional information such as a two-dimensional code or a digital watermark indicating the content of the image data is added to the image data, the specification processing unit 61 may determine whether the image data is the same based on the additional information.

A case where the number of copies of the document bundle specified by the specific processing unit 61 is a plurality of copies will be described. In this case, the storage processing unit 62 executes a process for correlating and storing document bundle image data corresponding to one copy of a document bundle among the image data read by the image reading unit 1 and specification information including at least the number of copies of the document bundle specified by the specification processing unit 61 in the storage device 7. Note that the storage destination of the image data and the specification information is not limited to the storage device 7, and may be a RAM of the control unit 6, a storage device of the information processing apparatus, or the like.

The printing processing unit 63 executes an image forming process of forming an image on a sheet by the image forming unit 3 based on the image data read by the image reading unit 1 or the image data inputted from the information processing apparatus. In particular, the printing processing unit 63 is able to execute a printing process for reproducing a document bundle read by the image reading unit 1 based on the document bundle image data and specification information stored in the storage device 7 or the like by the storage processing unit 62.

<Image Storage Process>

Figure 3:
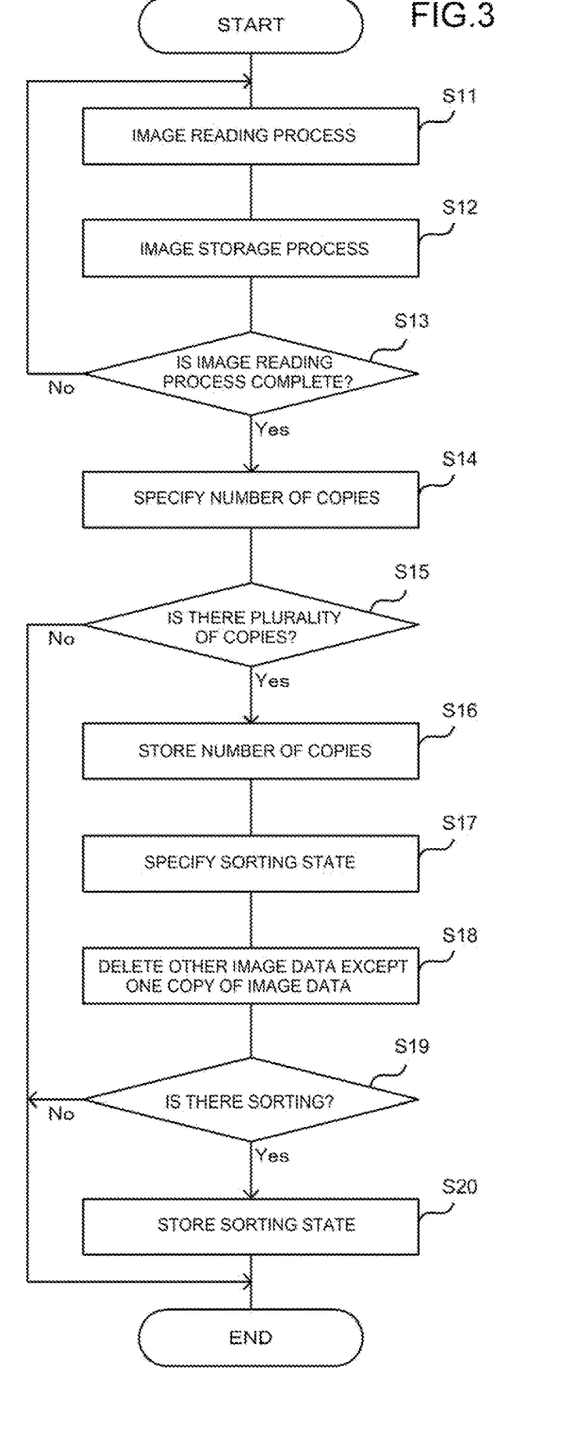
FIG. 3 is a flowchart for explaining an example of a procedure of an image storage process of an embodiment according to the present disclosure.

Hereinafter, an example of the procedure of the image storage process executed by the control unit 6 in the image forming apparatus 10 will be described with reference to the flowchart of FIG. 3. For example, the image storage process is executed by the control unit 6 in a case where an execution request operation for image saving processing is performed by using the operation display unit 5 with documents P placed on the document setting unit 21. Note that the present disclosure may be regarded as a disclosure of an image processing method in which the control unit 6 executes the image storage process, or as a disclosure of an image processing program for causing the control unit 6 to execute the image processing method.

<Step S11>

In step S11, the control unit 6 controls the image reading unit 1 and the ADF 2, sequentially conveys the documents P set in the document setting unit 21 by the ADF 2, and executes an image reading process for reading image data from each of the documents P.

<Step S12>

In step S12, the control unit 6 stores the image data read in step S11 in the storage device 7. At this time, the control unit 6 attaches specification information that can identify a document bundle of a group that includes the documents P corresponding to the image data to the image data and stores the image data in the storage device 7. Moreover, the control unit 6 stores each of the image data corresponding to each of the documents P included in the document bundle in the storage device 7 in the order read. Furthermore, the control unit 6 does not have to store the image data in the order read as long as a state in which the reading order of each of the image data can be identified by associating each of the image data with a page number or the like.

<Step S13>

In step S13, the control unit 6 determines whether or not the image reading process has been executed for all the documents P set in the document setting unit 21. For example, the document setting unit 21 is provided with an optical sensor for detecting the presence or absence of a document P, and in a case where the control unit 6 determines that there is no document P based on the detection result by the optical sensor, the control unit 6 determines that the image reading process is completed. Here, when it is determined that the image reading process is completed (S13: YES), the process proceeds to step S14, and when it is determined that the image reading process is not completed (S13: NO), the process is returned to step S11.

<Step S14>

In step S14, the control unit 6, based on the image data read in step S11 and stored in the storage device 7, specifies the number of copies of the document P corresponding to the image data. Note that step S14 is an example of the specification step according to the present disclosure, and is executed by the specification processing unit 61 of the control unit 6.

<Step S15>

In step S15, the control unit 6 determines whether or not the number of copies of the document P specified in step S14 is a plurality of copies. Here, when it is determined that the number of copies of the document P is a plurality of copies (S15: YES), the process proceeds to step S16, and when it is determined that the number of copies of the document P is not a plurality of copies (S15: NO), the image storage process ends.

<Step S16>

In step S16, the control unit 6 correlates the number of copies of the documents P specified in step S14 as specification information corresponding to the image data read in step S11 with the image data, and stores that specification information in the storage device 7.

<Step S17>

In step S17, the control unit 6 specifies the sorting state of the documents P corresponding to the image data based on the image data read in step S11 and stored in the storage device 7.

Figure 5:
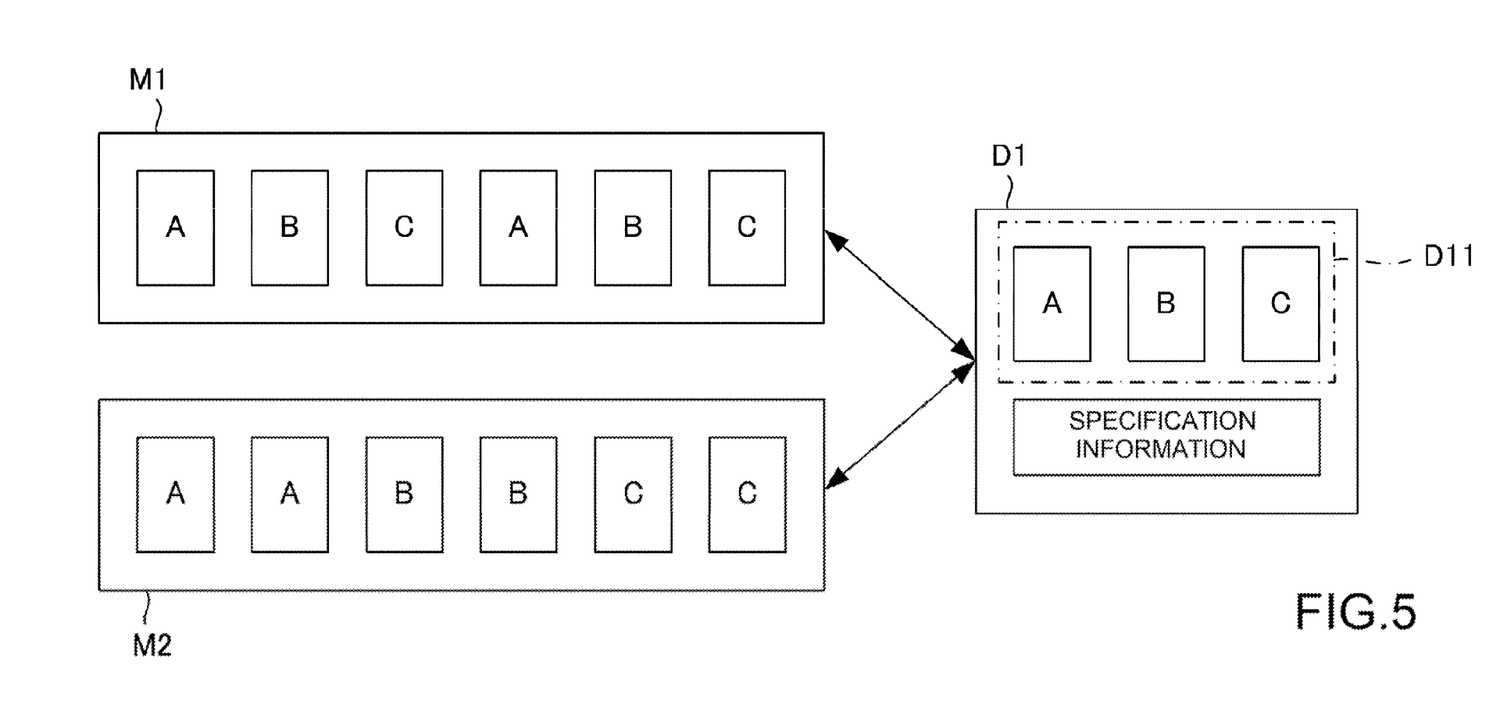
FIG. 5 is a diagram for explaining an example of an execution result of an image storage process of an embodiment according to the present disclosure.

For example, as illustrated in FIG. 5, in a case where the arranged order of the image data corresponding to the document bundle M1 is page A, B, C, A, B, C such that the documents P are arranged for each copy, the control unit 6 determines that the sorting state is "in units of copies". Moreover, as illustrated in FIG. 5, in a case where the arranged order of the image data corresponding to the document bundle M2 is page A, A, B, B, C, C such that the documents P are arranged for each page, the control unit 6 determines that the sorting state is "in units of pages". Note that in a case where the arranged order of the image data is not "in units of copies" or "in units of pages", it is determined that the sorting state is a "not sorted" state.

<Step S18>

In step S18, of the image data corresponding to the document bundle stored in the storage device 7 in step S12, except for image data corresponding to one copy of the document bundle included in the document bundle, the control unit 6 deletes the other image data from the storage device 7. In other words, the control unit 6 considers a case where the number of copies of the document bundle is specified to be a plurality of copies in step S14. In this case, only the document bundle image data that includes the image data corresponding to one copy of the document bundle of the image data read by the image reading unit 1 is correlated with the specification information that includes at least the number of copies of the document bundle specified in step S14 and stored in the storage device 7. Note that step S18 is an example of the storage step according to the present disclosure, and is executed by the storage processing unit 62 of the control unit 6.

Note that as another embodiment, a case will be described in which the control unit 6 does not store the image data read by the image reading unit 1 in the storage device 7, but temporarily stores the image data in the RAM or the like, and then specifies the number of copies of the document bundle in step S14. In this case, of the image data, only the document bundle image data that includes the image data corresponding to one copy of the document bundle is correlated with the specification information that includes at least the number of copies of the document bundle specified in step S14 and stored in the storage device 7.

<Step S19>

In step S19, the control unit 6 determines whether or not the sorting state in step S17 is a sorted state such as a copy units or page units. Here, when it is determined that the sorting state is a sorted state (S19: YES), the process proceeds to step S20, and when it is determined that the sorting state is not a sorted state (S19: NO), the image storage process ends.

<Step S20>

In step S20, the control unit 6 correlates the sorting state specified in the step S17 with the image data read in step S11, and stores the sorting state as specification information in the storage device 7. Note that step S20 is an example of the storage step according to the present disclosure, and is executed by the storage processing unit 62 of the control unit 6.

Here, FIG. 5 is a diagram illustrating an example of stored information D1 that is stored in the image storage process. As illustrated in FIG. 5, the document bundle image data D11, which is an example of document bundle image data that includes the image data of one copy of the document bundle, and the storage information D1 that includes the specification information are stored in the storage device 7. This is a case of a document bundle M1 that is a document bundle having two copies that include the three pages of document P, where the document P is arranged in copy units. Moreover, this is a case of a document bundle M2 that is a document bundle having two copies that include the three pages of document P, where the document P is arranged in page units. The specification information corresponding to the document bundle M1 includes information of "2 copies" as the number of copies of the document bundle M1 and information of "copy units" as the sorting state. Similarly, the specification information corresponding to the document bundle M2 includes information of "2 copies" as the number of copies of the document bundle M2, and information of "page units" as the sorting state.

As described above, a case will be considered in which in the image storage process, the number of copies of the document bundle corresponding to the image data read by the image reading unit 1 is specified, and the number of copies of the document bundle is specified to be a plurality of copies. In this case, of the image data read by the image reading unit 1, the image data corresponding to one copy of the document bundle and the specification information are correlated and stored. As a result, it is possible to reproduce a plurality of copies of the document bundle corresponding to the read image data while reducing the storage capacity required for the storage device 7. Moreover, in a case where the specification information includes the sorting state, it is also possible to reproduce the sorting state in the plurality of copies of the document bundle corresponding to the image data read based on the sorting state. Note that the specification information may include at least the number of copies, and does not need to include the sorting state.

Furthermore, in the image storage process, even when the document bundle is not sorted, the number of copies is determined based on the image data of the documents P included in the document bundle. Therefore, the user can set the document bundle in the document setting unit 21 without worrying about the sorting state of the document bundle. As a result, the user, for example, does not need to sort a plurality of pages for forming one document bundle from the plurality of copies of the document bundle in which different pages are mixed.

<Printing Control Process>

Hereinafter, an example of the procedure of the printing control process executed by the control unit 6 in the image forming apparatus 10 will be described with reference to the flowchart of FIG. 3. For example, the printing control process is executed by the control unit 6 when a printing execution request operation based on the image data stored in the storage device 7 is performed on the operation display unit 5. Note that the printing control process is executed by the printing processing unit 63 of the control unit 6.

<Step S21>

Figure 4:
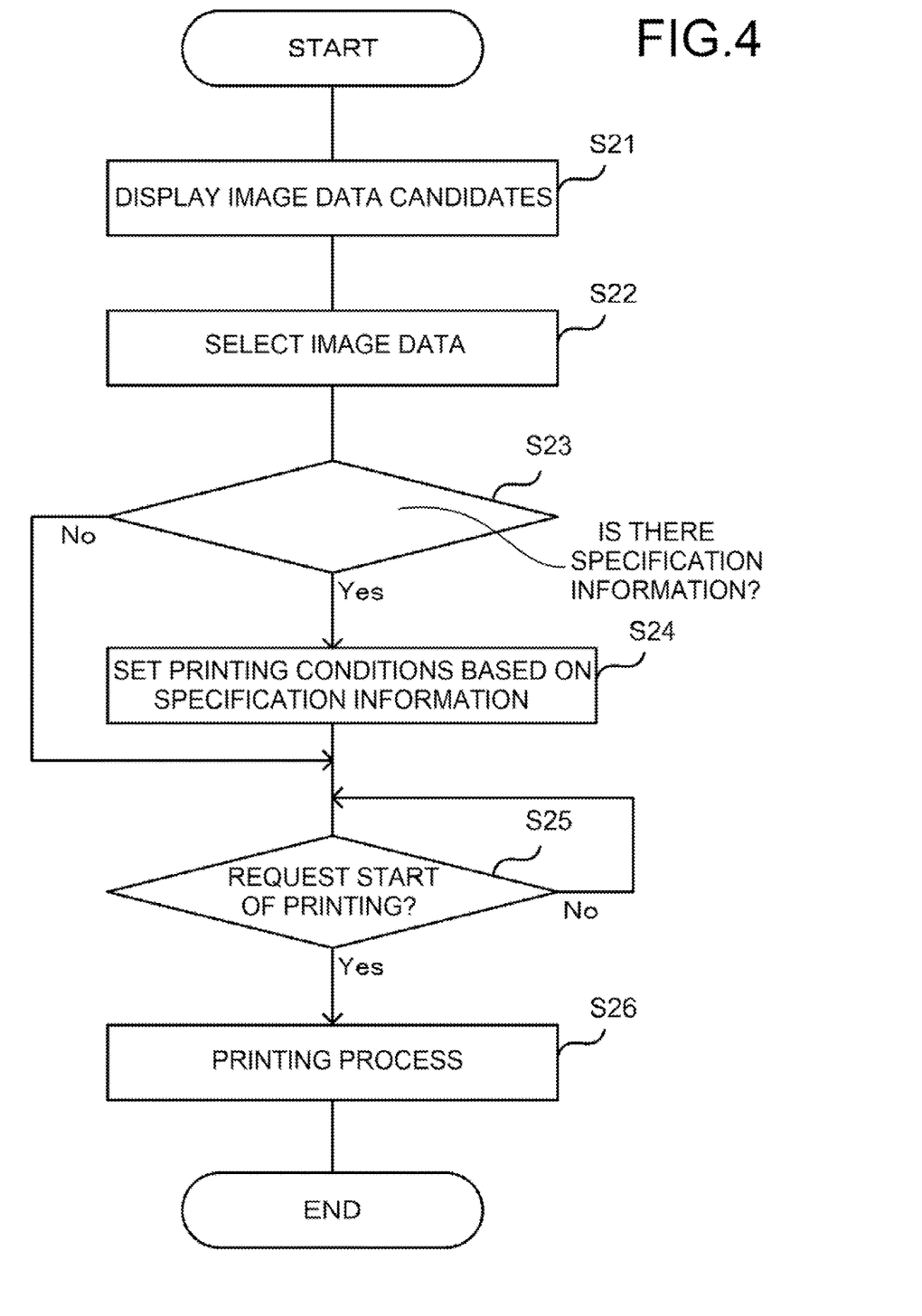
FIG. 4 is a flowchart for explaining an example of a procedure of a printing control process of an embodiment according to the present disclosure.

In step S21, the control unit 6 causes the operation display unit 5 to display a list of image data including the document bundle image data stored in the storage device 7 as candidates for printing target. For example, the image forming apparatus 10 is made to display a list of image data stored in a folder corresponding to the user who is currently logged in.

<Step S22>

In step S22, the control unit 6 receives an operation for selecting image data to be the printing target from the image data candidates displayed in step S21. Note that the image data selection method may be performed by inputting a file name of the image data or the like.

<Step S23>

In step S23, the control unit 6 determines whether or not there is specification information corresponding to the image data selected as the printing target in step S22. Note that the control unit 6 may determine that specification information does not exist in a case where the specification information corresponding to the image data is stored, and the number of copies or the sorting state is not stored in the specification information.

<Step S24>

In step S24, the control unit 6 sets printing conditions based on the specification information corresponding to the image data selected as the printing target in step S22. More specifically, the control unit 6 sets the number of copies included in the specification information as the number of copies to be printed, and sets the sorting state included in the specification information as the sorting condition.

<Step S25>

In step S25, the control unit 6 determines whether or not a printing start request has been performed on the operation display unit 5. Here, in a case where it is determined that a printing start request has been made (S25: YES), the process proceeds to step S26, and in a case where it is determined that a printing start request has not been made (S25: NO), the process waits in step S25. Note that while the process is waiting in step S25, the control unit 6 may change the printing conditions and the like set in step S24 according to the user operation on the operation display unit 5.

<Step S26>

In step S26, the control unit 6 controls the image forming unit 3 and the like based on the image data selected in step S22 and the printing conditions set based on the specification information corresponding to the image data. Then, the control unit 6 executes a printing process for reproducing the document bundle at the time when the image data was read by the image reading unit 1. More specifically, in a case where the image data is the document bundle image data, the control unit 6 prints each of the documents P included in the document bundle image data for the number of copies set as the printing condition. At this time, when the sorting condition is set as the printing condition, the documents P are printed based on the image data in the order in which the states sorted according to the sorting conditions (see the document bundle M1 or the document bundle M2 in FIG. 5) are reproduced.

For example, there is a case in which in the storage information D1 the document bundle image data D11 including image data for three pages of documents P is included, and specification information indicating that the number of copies is "2 copies" and the sorting state is "copy units" is stored, according to the document bundle image data D11. In this case, when the control unit 6 executes the printing process based on the document bundle image data D11 and the specification information, as shown in FIG. 5, the document bundle M1 in which the documents P are arranged in units of copies, which is two copies of the document bundle that includes three pages of documents P, is reproduced.

Similarly, there is a case in which in the storage information D1 the document bundle image data D11 including image data for three pages of documents P is included, and specification information indicating that the number of copies is "2 copies" and the sorting state is "page units" is stored, according to the document bundle image data D11. In this case, when the control unit 6 executes the printing process based on the document bundle image data D11 and the specification information, as shown in FIG. 5, the document bundle M2 in which the documents P are arranged in units of pages, which is two copies of the document bundle that includes three pages of documents P, is reproduced.

As described above, a case will be considered in which, in the image forming apparatus 10, image data corresponding to one copy of the document bundle and specification information corresponding to the image data are stored in the storage device 7. In this case, it is possible to execute a printing process for reproducing an original plurality of copies of the document bundle based on the image data and the specification information, and therefore the storage capacity of the storage device 7 required for that purpose may be reduced.

Incidentally, in the present embodiment, a case in which the specification information includes the number of copies and the sheet state has been described as an example. On the other hand, the specification information is not limited to the number of copies and the sheet state, and may include other information. For example, it is conceivable that the specification information includes printing setting information that is inputted in advance by a user operation on the operation display unit 5 as printing conditions in the printing process based on the image data. The printing setting information is information related to various printing settings such as double-sided setting information (double-sided or single-sided), aggregated setting information (2in1, 4in1, etc.), sheet type setting information (color paper, backing paper, and the like), and the like. The printing setting information is inputted by a user operation, for example, when the image storage process is executed.

When the specification information includes the printing setting information, the control unit 6 may automatically set the printing conditions based on the printing setting information in the step S24. Moreover, a case will be described in which the control unit 6 automatically sets only the number of copies and the sorting state of the specification information as the printing conditions, and does not automatically set the printing setting information as the printing conditions, when a printing start request is performed in step S25. In this case, it is also conceivable for the operation display unit 5 to display a warning or the like in a case where the presently set printing conditions are different than the printing conditions in the printing setting information.

Furthermore, in the present embodiment, a case will be described in which an image storage process is executed in order to store the image data read from the document bundle in the storage device 7. On the other hand, it is also conceivable for the control unit 6 to execute the image storage process and also execute a copy process for executing a printing process based on the image data. In this case, at the start of the copying process, the control unit 6 may receive in advance the settings of the printing conditions for the printing process to be executed in the copying process in response to a user operation on the operation display unit 5. Therefore, it is conceivable for the control unit 6 to include the printing conditions preset at the start of the copy process as the printing setting information in the specification information stored in the image storage process.

Furthermore, in the present embodiment, a case is described in which the number of copies of the document bundle is stored as the specification information in the unit of document bundles. On the other hand, it is conceivable for the specification processing unit 61 to specify the number of copies for each page in the document bundle. In this case, the specification information includes the number of copies per page in the document bundle. As a result, for example, the control unit 6, based on the specification information, may set the number of copies to be printed per page in the document bundle as a printing condition when executing the printing process based on the image data corresponding to the document bundle in the printing control process.

Incidentally, in a typical technique, in a case where the number of copies of a document bundle to be a reading target by an image processing apparatus is a plurality of copies and all the image data of the plurality of copies of the document bundle is stored in the storage device, the storage capacity of the storage device is used in a wasteful manner.

According to the present disclosure, an image processing apparatus, an image processing method, and a recording medium are provided that are capable of reproducing a plurality of copies of a document bundle corresponding to the read image data while reducing the storage capacity required for the storage device.

What is claimed is:

1. An image processing apparatus, comprising a controller comprising a processor which reads a control program to function as:
   a specification processing unit that specifies a number of copies of a document bundle present in a reading target of an image reading unit that reads image data from each document included in one copy or a plurality of copies of the document bundle; and
   a storage processing unit that, in a case where the number of copies of the document bundle specified by the specification processing unit is plural, stores a) document bundle image data corresponding to one copy of the document bundle of the image data read by the image reading unit, and b) specification information including at least the number of copies of the document bundle specified by the specification processing unit, wherein the stored document bundle image data corresponding to one copy and the stored specification information are stored as correlated with each other.

2. The image processing apparatus according to claim 1, wherein the specification processing unit specifies a number of image data having the same content of the image data read by the image reading unit as the number of copies of the document bundle.

3. The image processing apparatus according to claim 1, wherein the controller determines an arrangement order of the image data of each of the documents included in the plurality of copies read by the image reading unit based on the order in which the documents were read by the image reading unit, and specifies a sorting state of the document bundle based on the arrangement order determined;

the specification information includes the sorting state of the document bundle corresponding to the image data read by the image reading unit; and the controller can, based on the stored document bundle image data and the stored specification information, reproduce the reading target, wherein said reproduction includes the number of copies of the document bundle present in the reading target and the arrangement order of the copies of the document bundle.

4. The image processing apparatus according to claim 1, comprising a printing processing unit that executes a printing process for reproducing the reading target read by the image reading unit based on the document bundle image data and the specification information, wherein the reproduction includes the number of copies of the document bundle present in the reading target.

5. The image processing apparatus according to claim 1, wherein the specification information includes printing setting information that is inputted in advance as printing conditions in the printing process based on the image data.

6. The image processing apparatus according to claim 1, wherein the specification processing unit specifies a number of copies of each page in the document bundle; and the specification information includes the number of copies of each page in the document bundle.

7. The image processing apparatus according to claim 3, comprising a printing processing unit that executes a printing process for printing said reproduction of the reading target.

8. An image processing method comprising:

a specification step of specifying a number of copies of a document bundle present in reading target by an image reading unit that reads image data from each document included in one copy or a plurality of copies of the document bundle; and a storage processing step that, in a case where the number of copies of the document bundle specified by the specification step is plural, stores a) document bundle image data corresponding to one copy of the document bundle of the image data read by the image reading unit, and b) specification information including at least the number of copies of the document bundle specified in the specification step, wherein the stored document bundle image data corresponding to one copy and the stored specification information are stored as correlated with each other.

9. A recording medium that is a non-transitory computer-readable recording medium that stores an image processing program that can be executed by a processor of an image processing apparatus; wherein the image processing program, when executed, causes the processor to specify a number of copies of a document bundle present in a reading target by an image reading unit that reads image data from each document included in one copy or a plurality of copies of the document bundle; and in a case where the specified number of copies of the document bundle is plural, store a) document bundle image data corresponding to one copy of the document bundle of the image data read by the image reading unit, and b) specification information including at least the number of copies of the document bundle specified in the specification step, wherein the stored document bundle image data corresponding to one copy and the stored specification information are stored as correlated with each other.

* * * * *